United States Patent
Su et al.

(10) Patent No.: US 12,492,204 B2
(45) Date of Patent: Dec. 9, 2025

(54) SUBSTITUTED (7H-PYRROLO[2,3-D]PYRIMIDIN-4-YL) AMINO COMPOUNDS USEFUL AS JAK 1 INHIBITORS

(71) Applicant: CHEMWERTH, INC., Woodbridge, CT (US)

(72) Inventors: Xiping Su, Woodbridge, CT (US); Sidney Xi Liang, Bethany, CT (US); Peter J. Werth, Woodbridge, CT (US)

(73) Assignee: CHEMWERTH, INC., Woodbridge, CT (US)

( * ) Notice: Subject to any disclaimer, the term of this patent is extended or adjusted under 35 U.S.C. 154(b) by 906 days.

(21) Appl. No.: 17/638,074

(22) PCT Filed: Aug. 25, 2020

(86) PCT No.: PCT/US2020/047767
§ 371 (c)(1),
(2) Date: Feb. 24, 2022

(87) PCT Pub. No.: WO2021/041392
PCT Pub. Date: Mar. 4, 2021

(65) Prior Publication Data
US 2022/0274992 A1    Sep. 1, 2022

Related U.S. Application Data

(60) Provisional application No. 62/891,706, filed on Aug. 26, 2019.

(51) Int. Cl.
*A61K 31/519* (2006.01)
*C07D 487/04* (2006.01)

(52) U.S. Cl.
CPC ................ *C07D 487/04* (2013.01)

(58) Field of Classification Search
CPC ................ A61K 31/519; C07D 487/04
USPC ................ 514/265.1; 544/280
See application file for complete search history.

(56) References Cited

U.S. PATENT DOCUMENTS

| | | |
|---|---|---|
| 8,633,206 B2 | 1/2014 | Promo et al. |
| 2011/0136765 A1 | 6/2011 | Promo et al. |
| 2017/0233397 A1 | 8/2017 | Stuk et al. |

FOREIGN PATENT DOCUMENTS

| | | | |
|---|---|---|---|
| CN | 102014627 A | 4/2011 | |
| CN | 102574860 A | 7/2012 | |
| CN | 103415520 A | 11/2013 | |
| CN | 108699072 A | 10/2018 | |
| EP | 2796460 A1 | 10/2014 | |
| WO | 2020084435 A1 | 4/2020 | |
| WO | WO-2021041392 A1 * | 3/2021 | ............ A61P 29/00 |

OTHER PUBLICATIONS

Jordan, V. C. Nature Reviews: Drug Discovery, 2, 2003, 205.*
Dörwald, F. Zaragoza. Side Reactions in Organic Synthesis: A Guide to Successful Synthesis Design, Weinheim: WILEY-VCH Verlag GmbH & Co. KGaA, 2005, Preface.*
Extended European Search Report for EP Application No. 20858240.3-1110; Dated—Dec. 6, 2022; 6 pages.
Vazquez et al., "Identification of N-{cis-3-[Methyl(7H-pyrrolo[2,3-d]pyrimidin-4-yl)amino]cyclobutyl}propane-1-sulfonamide (PF-04965842): A Selective JAK1 Clinical Candidate for the Treatment of Autoimmune Diseases," Journal of Medicinal Chemistry, (2018), vol. 61, (No. 3), 1130-1152.
International Search Report; International Application No. PCT/US2020/47767; International Filing Date—Aug. 25, 2020; Date of Mailing—Nov. 23, 2020; 4 pages.
PubChem CID 12083227, Compound Summary, N-Cyclohexyl-N-methyl-7H-pyrrolo[2,3-d]pyrimidin-4-amine, create date Feb. 7, 2007, 8 pages.
Written Opinion for International Application No. PCT/US2020/47767; International Filing Date—Aug. 25, 2020; Date of Mailing—Nov. 23, 2020; 33 pages.

* cited by examiner

*Primary Examiner* — Douglas M Willis
(74) *Attorney, Agent, or Firm* — CANTOR COLBURN LLP

(57) ABSTRACT

The disclosure provides compounds and pharmaceutically acceptable salts thereof of Formula (I) The variables, R, R!-R3 and the A-ring are described herein. A can be a cyclohexyl ring. The compounds are inhibitors of JAK1 Kinase and are useful in methods of treating an allergic, inflammatory, or autoimmune disorders, in a patient, comprising administering a therapeutically effective amount of compound of Formula I or salt thereof, to the patient. The disclosure also provides pharmaceutical formulations containing a compound of Formula I.

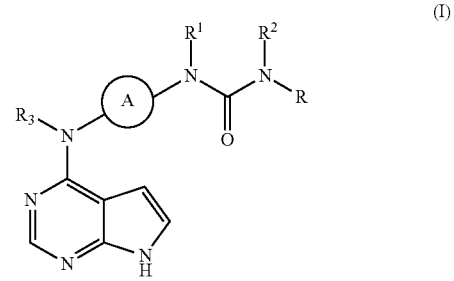

(I)

21 Claims, No Drawings

SUBSTITUTED (7H-PYRROLO[2,3-D]PYRIMIDIN-4-YL) AMINO COMPOUNDS USEFUL AS JAK 1 INHIBITORS

CROSS REFERENCE TO RELATED APPLICATIONS

This application is a National Stage application of PCT/US2020/047767 filed on Aug. 25, 2020, which claims priority to U.S. Provisional Application No. 62/891,706 filed on Aug. 26, 2019, and all the benefits accruing therefrom under 35 U.S.C. § 119, the content of which is incorporated by reference in its entirety.

FIELD OF THE DISCLOSURE

This disclosure provides substituted (7H-pyrrolo-[2,3-D]pyrimidin-4-yl)amino compounds and pharmaceutically acceptable salts thereof useful as JAK1 inhibitors. The disclosure also provides pharmaceutical compositions and dosage forms containing such compounds. The disclosure further provides methods of treating certain allergic, inflammatory, and autoimmune disorders with a (7H-pyrrolo-[2,3-D]pyrimidin-4-yl)amino compound of the disclosure.

BACKGROUND

Protein kinases are enzymes that catalyze the phosphorylation of specific residues in proteins, and are broadly classified into tyrosine and serine/threonine kinases. Inappropriate kinase activity, arising from mutation, over-expression, or inappropriate regulation, dys-regulation or de-regulation, as well as over- or under-production of growth factors or cytokines has been implicated in many diseases, including but not limited to cancer, cardiovascular diseases, allergies, asthma and other respiratory diseases, autoimmune diseases, inflammatory diseases, bone diseases, metabolic disorders, and neurological and neurodegenerative disorders.

The JAK (Janus-associated kinase) family includes four non-receptor tyrosine kinases, JAK1, JAK2, JAK3 and Tyk2, which play a critical role in cytokine signaling and growth factor mediated signal transduction. Upon binding to their receptors, cytokines activate JAK, which then phosphorylates the cytokine receptor, thereby creating docking sites for signaling molecules, notably, members of the Signal Transducer and Activator of Transcription (STAT) family that ultimately lead to gene expression. Numerous cytokines are known to activate the JAK family.

JAK1 kinase interacts with, among others, type I interferon receptors (e.g., IFN alpha), type II interferon receptors (e.g., IFN gamma), the common gamma chain γc (e.g., IL-2, IL-4, IL-7, IL-9, IL-15 and IL-21), and the interleukin-6 family (IL-10, IL-13 and IL-22). After these cytokines bind to their receptors, receptor oligomerization occurs, resulting in the cytoplasmic tails of associated JAK kinases moving into proximity and facilitating the trans-phosphorylation and activation of tyrosine residues on the JAK kinase. Phosphorylated JAK kinases bind and activate various STAT proteins. These STAT proteins then dimerize and translocate to the nucleus where they function as both signaling molecules and transcription factors and ultimately bind to specific DNA sequences present in the promoters of cytokine-responsive genes. Various immunodeficiency and autoimmune diseases, such as allergies, asthma, alopecia areata, transplant (allograft) rejection, rheumatoid arthritis, amyotrophic lateral sclerosis and multiple sclerosis, and solid and hematologic cancers result from signaling disruption in the JAK/STAT pathway.

An important element of JAK1 is the ability to pair with other JAK kinases at the intracellular domains of different subunits of the receptor. For example, JAK3 associates with the common gamma chain (γc) of the various cytokine receptors. It has been indicated that JAK1 is dominant over JAK3, and inhibition of JAK1 is sufficient to inactivate signaling through the common gamma chain despite JAK3 activity. Thus, selective inhibition of JAK1 may be sufficient to treat a number of inflammatory and autoimmune diseases associated with cytokine signaling via the JAK1/JAK3-STAT pathway.

There are few selective JAK1 inhibitors to date that have little to no off-target activity against other JAK kinases. Compounds identified as JAK1 selective inhibitors exhibit only marginal JAK1 selectivity. There is a need, therefore, to develop highly potent and selective JAK1 inhibitors to treat JAK1-related disorders, including allergic, inflammatory, and autoimmune disorders.

SUMMARY

The disclosure provides compounds and pharmaceutically acceptable salts thereof of Formula I

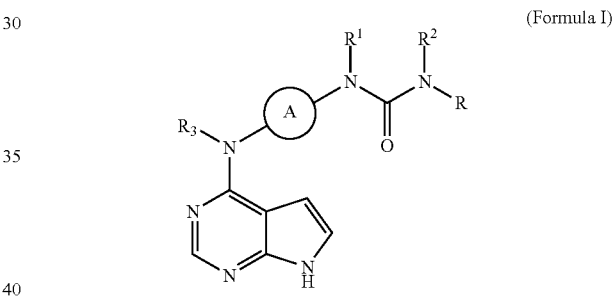

(Formula I)

Within Formula I the variables, R, $R^1$-$R^3$, and Ring A have the following definitions.

R is $C_1$-$C_6$ alkyl, which is optionally substituted with halogen, cyano, or amino.

$R^1$ and $R^2$ are independently chosen from hydrogen, $C_1$-$C_6$ alkyl, ($C_3$-$C_6$cycloalkyl)$C_0$-$C_2$alkyl, (phenyl)$C_0$-$C_2$alkyl, and (4- to 6-membered heterocycle)$C_0$-$C_2$alkyl.

$R^3$ is $C_1$-$C_4$alkyl. The 4- to 6-membered heterocycle is saturated, partially unsaturated, or unsaturated, and contains 1, 2, 3, or 4 heteroatoms independently chosen from N, O, and S. It is preferred that not more than one heteroatom in the 4- to 6-membered heterocycle is O or S.

Ring A,

is a $C_3$-$C_7$ cycloalkyl or a 4-6 membered heterocycloalkyl ring having 1 or 2 heteroatoms independently chosen from N, O, and S. For example Ring A can be a cyclopropyl, cyclobutyl, cyclopentyl, cyclohexyl, azetidinyl, pyrrolidinyl, tetrahydrofuranyl, tetrahydrothiophenyl, piperidinyl, morpholinyl, thiomorpholinyl, or piperazinyl group.

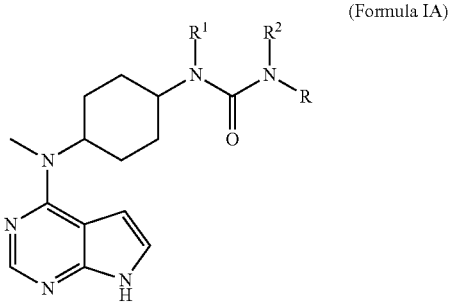

(Formula IA)

Or a pharmaceutically acceptable salt thereof. Within Formula I, the variables R, $R^1$, and $R^2$ carry the following definitions.

R is $C_1$-$C_6$ alkyl, which is optionally substituted with halogen, cyano, or amino.

$R^1$ and $R^2$ are independently chosen from hydrogen, $C_1$-$C_6$ alkyl, or ($C_3$-$C_6$cycloalkyl)$C_0$-$C_2$alkyl.

The disclosure also includes pharmaceutical composition comprising a compound of Formula I, or salt thereof, together with a pharmaceutically acceptable excipient.

The disclosure includes a method of treating an allergic, inflammatory, or autoimmune disorder in a patient, comprising administering a therapeutically effective amount of compound of Formula I or salt thereof, to the patient. The compound of Formula I may be in the form of a pharmaceutical formulation.

DETAILED DESCRIPTION

Terminology

Presently disclosed compounds are described using standard nomenclature. Unless defined otherwise, all technical and scientific terms used herein have the same meaning as is commonly understood by one of skill in the art to which this disclosure belongs. Unless clearly contraindicated by the context each compound name includes the free acid or free base form of the compound as all pharmaceutically acceptable salts of the compound.

The phrase "compounds of Formula I" encompasses all compounds that satisfy Formula I, including any enantiomers, racemates and stereoisomers, as well as all pharmaceutically acceptable salts of such compounds and also includes all subgeneric groups of Formula I, unless clearly contraindicated by the context in which this phrase is used. Formula I includes Formula IA and Formula IB.

The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to"). Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate and does not pose a limitation on the scope of the disclosure unless otherwise claimed. No language in the specification should be construed as indicating any non-claimed element as essential to the practice as used herein. Unless defined otherwise, technical and scientific terms used herein have the same meaning as is commonly understood by one of skill in the art to which this disclosure belongs.

An "active agent" means a compound (including a compound disclosed herein), element, or mixture that when administered to a patient, alone or in combination with another compound, element, or mixture, confers, directly or indirectly, a physiological effect on the patient. The indirect physiological effect may occur via a metabolite or other indirect mechanism.

A dash ("-") that is not between two letters or symbols is used to indicate a point of attachment for a substituent. For example, —$CH_2CF_3$ is attached through carbon of the methylene ($CH_2$) group.

"Alkyl" is a branched or straight chain saturated aliphatic hydrocarbon group, having the specified number of carbon atoms, generally from 1 to about 8 carbon atoms. The term $C_1$-$C_6$alkyl indicates an alkyl group having from 1, 2, 3, 4, 5, or 6 carbon atoms. Other embodiments include alkyl groups having from 1 to 8 carbon atoms, 1 to 4 carbon atoms, or 1 or 2 carbon atoms, e.g., $C_1$-$C_8$alkyl, $C_1$-$C_4$alkyl, and $C_1$-$C_2$alkyl.

"Cycloalkyl" is a saturated monocyclic hydrocarbon group, having the indicated number of carbon atoms, generally from about 3 to about 8 carbon atoms. Monocyclic cycloalkyl groups usually have from 3 to about 6 ring atoms. The $C_3$-$C_6$cycloalkyl indicates a cycloalkyl group having 3, 4, 5, or 6 carbon atoms. Cycloalkyl groups include cyclopropyl, cyclobutyl, cyclopentyl, and cyclohexyl groups. Cycloalkyl groups include cycloalkyl groups having no substituents. Cycloalkyl groups include cycloalkyl groups having 1 to 4 alkyl substituents, for example, 1, 2, 3, or 4 substituents. In some embodiments, cycloalkyl groups include cycloalkyl groups having 3 to 6 carbon ring atoms, and 0 to 2 alkyl substituents, e.g., ($C_3$-$C_6$cycloalkyl)$C_0$-$C_2$alkyl.

"Halo" or "halogen" is any of fluoro, chloro, bromo, and iodo.

The term "heterocycloalkyl," means a saturated ring group usually having 3- to 7-ring atoms with 1 or 2 ring atoms independently chosen from N, O, and S: Examples of heterocycloalkyl groups includes azepines, azetidinyl, morpholinyl, pyranyl, oxopiperidinyl, oxopyrrolidinyl, piperazinyl, piperidinyl, pyrrolidinyl, quinicludinyl, thiomorpholinyl, tetrahydropyranyl and tetrahydrofuranyl.

The term "heterocyclic group" means a cyclic group containing at least on ring heteroatom chosen from N, O, and S. The heterocyclic group can be fully saturated, i.e. a heterocycloalkyl group, partially unsaturated, e.g. a heterocycloalkenyl group, or aromatic, e.g. a heteroaryl group. The heterocyclic group can contain one ring having 4 to 7 ring members and one, two, three, or four heteroatoms independently chosen from N, O, and S. It is preferred that not more than two heteroatoms are O or S and O and S atoms are not adjacent. The heterocyclic group can also contain two fused ring or two rings in spiro orientation; only one ring in a two ring heterocyclic group is required to contain a heteroatom.

The term "substituted" means that any one or more hydrogens on the designated atom or group is replaced with a selection from the indicated group, provided that the designated atom's normal valence is not exceeded. When the substituent is oxo (i.e., =O) then 2 hydrogens on the atom are replaced. When an oxo group substitutes aromatic moieties, the corresponding partially unsaturated ring replaces the aromatic ring. For example a pyridyl group substituted by oxo is a pyridone. Combinations of substituents and/or variables are permissible only if such combinations result in stable compounds or useful synthetic intermediates. A stable compound or stable structure is meant to imply a compound that is sufficiently robust to survive isolation from a reaction mixture, and subsequent formulation into an effective therapeutic agent. Unless otherwise specified, substituents are named into the core structure. For example, it is to be understood that when aminoalkyl is listed as a possible substituent the point of attachment of this substituent to the core structure is in the alkyl portion.

"Pharmaceutical compositions" are compositions comprising at least one active agent, such as a compound or salt of Formula I, and at least one other substance, such as an excipient. Pharmaceutical compositions meet the U.S. FDA's good manufacturing practice (GMP) standards for human or non-human drugs.

"Pharmaceutically acceptable salts" includes derivatives of the disclosed compounds in which the parent compound is modified by making inorganic and organic, non-toxic, acid or base addition salts thereof. The salts of the present compounds can be synthesized from a parent compound that contains a basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate, or the like), or by reacting free base forms of these compounds with a stoichiometric amount of the appropriate acid. Such reactions are typically carried out in water or in an organic solvent, or in a mixture of the two. Generally, non-aqueous media like ether, ethyl acetate, ethanol, isopropanol, or acetonitrile are preferred, where practicable. Salts of the present compounds further include solvates of the compounds and of the compound salts.

Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts and the quaternary ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—$(CH_2)_n$-COOH where n is 0-4, and the like.

An "excipient" is an inactive ingredient useful in preparing a pharmaceutical composition that is generally safe, non-toxic, and neither biologically nor otherwise undesirable, and includes an excipient that is acceptable for veterinary use as well as human pharmaceutical use.

The term "carrier" applied to pharmaceutical compositions of the disclosure refers to a diluent, excipient, or vehicle with which an active compound is provided. An excipient is an inactive ingredient useful in preparing a pharmaceutical composition that is generally safe, non-toxic, and neither biologically nor otherwise undesirable, and includes an excipient that is acceptable for veterinary use as well as human pharmaceutical use.

A "patient" is a human or non-human animal in need of medical treatment. Medical treatment can include treatment of an existing condition, such as a disease or disorder, prophylactic or preventative treatment, or diagnostic treatment. In some embodiments the patient is a human patient. In certain embodiments the patient is a companion animal, such as a cat or dog, or a livestock animal, such as a horse, a bovine, or a swine.

"Administering a compound of Formula I with at least one additional active agent" means the compound of Formula I and the additional active agent(s) are provided simultaneously in a single dosage form, provided concomitantly in separate dosage forms, or provided in separate dosage forms for administration separated by some amount of time that is within the time in which both the compound of Formula I and at least one additional active agent are within the blood stream of a patient. The compound of Formula I and the additional active agent need not be prescribed for a patient by the same medical care worker. The additional active agent or agents need not require a prescription. Administration of the compound of Formula I or the at least one additional active agent can occur via any appropriate route, for example, oral tablets, oral capsules, oral liquids, inhalation, injection, suppositories or topical contact.

"Treatment" as used herein includes providing a compound of Formula I, either as the only active agent or together with at least one additional active agent sufficient to: (a) inhibiting the disease, i.e., arresting its development; and (b) relieving the disease, i.e., causing regression of the disease. "Treating" and "treatment" also means providing a therapeutically effective amount of a compound of Formula I, as the only active agent or together with at least one additional active agent to a patient having a bacterial infection.

A "therapeutically effective amount" of a compound of Formula I or composition of this disclosure means an amount effective, when administered to a patient, to provide a therapeutic benefit such as an amelioration of symptoms, e.g., an amount effective to decrease the symptoms of an inflammatory disorder. For example a patient having an inflammatory condition may present elevated levels of certain liver enzymes or an elevated white blood cell count. A therapeutically effect amount is thus an amount sufficient to provide a significant reduction in elevated liver enzyme levels or white blood cell count, or an amount sufficient to provide a return of the liver enzyme levels or white blood cell count to the normal range.

Chemical Description

Formula I includes all subformulae thereof. In certain situations, the compounds of Formula I may contain one or more asymmetric elements such as stereogenic centers, stereogenic axes and the like, e.g. asymmetric carbon atoms, so that the compounds can exist in different stereoisomeric forms. These compounds can be, for example, racemates or optically active forms. For compounds with two or more asymmetric elements, these compounds can additionally be mixtures of diastereomers. For compounds having asymmetric centers, it should be understood that all of the optical isomers and mixtures thereof are encompassed. In addition, compounds with carbon-carbon double bonds may occur in Z- and E-forms, with all isomeric forms of the compounds being included in the present disclosure. In these situations, single enantiomers, i.e., optically active forms, can be obtained by asymmetric synthesis, synthesis from optically pure precursors, or by resolution of the racemates. Resolution of the racemates can also be accomplished, for example, by conventional methods such as crystallization in the presence of a resolving agent or chromatography, using, for example, a chiral high pressure liquid chromatography (HPLC) column.

Where a compound exists in various tautomeric forms, the disclosure is not limited to any one of the specific tautomers, but rather includes all tautomeric forms.

The present disclosure is intended to include all isotopes of atoms occurring in the present compounds. Isotopes include those atoms having the same atomic number but different mass numbers. By way of general example, and without limitation, isotopes of hydrogen include tritium and deuterium and isotopes of carbon include $^{11}C$, $^{13}C$, and $^{14}C$.

Certain compounds are described herein using a general formula that includes variables, e.g., R, $R^1$, $R^2$, and $R^3$. Unless otherwise specified, each variable within such a formula is defined independently of other variables. Thus, if a group is said to be substituted, e.g., with 0-2 R*, then the group may be substituted with up to two R* groups and R* at each occurrence is selected independently from the definition of R*. Also, combinations of substituents and/or variables are permissible only if such combinations result in stable compounds.

In addition to compounds of Formula I and IA as described above, the disclosure also includes compounds of Formula I and IA in which one or more of the following conditions is met for the variables in Formula I and IA. Embodiments of this disclosure include any combination of conditions listed below, so long as a stable compound results.

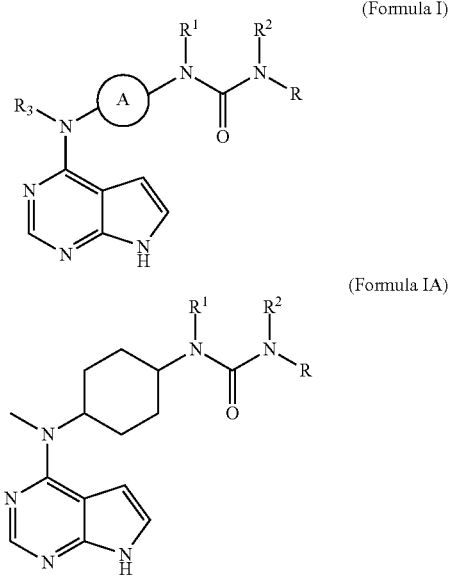

Compounds having any combination of the variable definitions set forth below that result in a stable compound are included in the disclosure.

In Formula I or IA, R is $C_1$-$C_6$ alkyl, which is optionally substituted with halogen, cyano, or amino.

In Formula I or IA, $R^1$ and $R^2$ are independently chosen from hydrogen, $C_1$-$C_6$ alkyl, or ($C_3$-$C_6$cycloalkyl)$C_0$-$C_2$alkyl.

The disclosure also includes compounds having stereochemistry of Formula Ia.

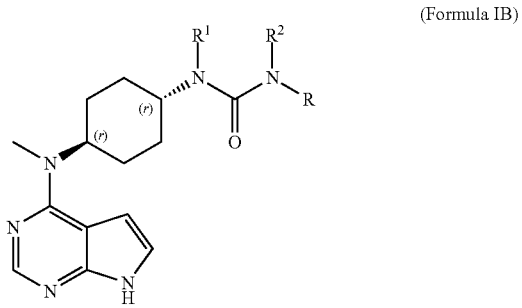

In Formula IB, R is $C_1$-$C_6$ alkyl, which is optionally substituted with halogen, cyano, or amino.

In Formula IB, $R^1$ and $R^2$ are independently chosen from hydrogen, $C_1$-$C_6$ alkyl, or ($C_3$-$C_6$cycloalkyl)$C_0$-$C_2$alkyl.

The Variable R

The disclosure includes compounds and salts of any of the above Formulas in which R carries any of the following definitions:

(a) R is $C_1$-$C_6$ alkyl, which is optionally substituted with halogen, cyano, or amino.

(b) R is $C_1$-$C_6$ alkyl substituted with fluoro, chloro, bromo, or iodo.

(c) R is $C_1$-$C_6$ alkyl substituted with cyano or amino.

(d) R is methyl, propyl, isopropyl, butyl, pentyl, or hexyl.

(e) R is methyl, propyl, isopropyl, butyl, pentyl, or hexyl substituted with fluoro, chloro, bromo, or iodo.

(f) R is methyl, propyl, isopropyl, butyl, pentyl, or hexyl substituted with cyano or amino.

(g) R is —$CH_2CN$ or —$CH_2CF_3$.

The Variable $R^1$

The disclosure includes compounds and salts of any of the above Formulas in which $R^1$ carries any of the following definitions:

(a) $R^1$ is hydrogen.

(b) $R^1$ is $C_1$-$C_6$ alkyl, which is optionally substituted with halogen, cyano, or amino.

(c) $R^1$ is $C_1$-$C_6$ alkyl substituted with fluoro, chloro, bromo, or iodo.

(d) $R^1$ is $C_1$-$C_6$ alkyl substituted with cyano or amino.

(e) $R^1$ is methyl, propyl, isopropyl, butyl, pentyl, or hexyl.

(f) $R^1$ is methyl, propyl, isopropyl, butyl, pentyl, or hexyl substituted with fluoro, chloro, bromo, or iodo.

(g) $R^1$ is methyl, propyl, isopropyl butyl, pentyl, or hexyl substituted with cyano or amino.

(h) $R^1$ is —$CH_2CN$ or —$CH_2CF_3$.

(i) $R^1$ is ($C_3$-$C_6$cycloalkyl)$C_0$-$C_2$alkyl which is optionally substituted with halogen, cyano, or amino.

(j) $R^1$ is ($C_3$-$C_6$cycloalkyl)$C_0$-$C_2$alkyl substituted with fluoro, chloro, bromo, or iodo.

(k) $R^1$ is ($C_3$-$C_6$cycloalkyl)$C_0$-$C_2$alkyl substituted with cyano or amino.

(l) $R^1$ is $C_3$-$C_6$cycloalkyl.

(m) $R^1$ is cyclopropyl, cyclobutyl, cyclopentyl, or cyclohexyl.

(n) $R^1$ is hydrogen, $C_1$-$C_6$ alkyl, ($C_3$-$C_6$cycloalkyl)$C_0$-$C_2$alkyl, (phenyl)$C_0$-$C_2$alkyl, (tetrahydrofuranyl)$C_0$-$C_2$alkyl, (furanyl)$C_0$-$C_2$alkyl, (pyrrolidinyl)$C_0$-$C_2$alkyl, (pyrrolyl)$C_0$-$C_2$alkyl, (thienyl)$C_0$-$C_2$alkyl, (imidazolyl)$C_0$-$C_2$alkyl, (oxazolyl)$C_0$-$C_2$alkyl, (pyridinyl)$C_0$-$C_2$alkyl, or (pyrazinyl alkyl)$C_0$-$C_2$alkyl.

(o) $R^1$ is cyclopropyl, cyclobutyl, cyclopentyl, or cyclohexyl substituted with fluoro, chloro, bromo, or iodo.

(p) $R^1$ cyclopropyl, cyclobutyl, cyclopentyl, or cyclohexyl substituted with cyano or amino.

(q) $R^1$ is $(C_3$-$C_6$cycloalkyl)$C_1$-alkyl.

(r) $R^1$ is $(C_3$-$C_6$cycloalkyl)$C_2$-alkyl.

The Variable $R^2$

The disclosure includes compounds and salts of any of the above Formulas in which $R^2$ carries any of the following definitions:

(a) $R^2$ is hydrogen.

(b) $R^2$ is $C_1$-$C_6$ alkyl, which is optionally substituted with halogen, cyano, or amino.

(c) $R^2$ is $C_1$-$C_6$ alkyl substituted with fluoro, chloro, bromo, or iodo.

(d) $R^2$ is $C_1$-$C_6$ alkyl substituted with cyano or amino.

(e) $R^2$ is methyl, propyl, isopropyl, butyl, pentyl, or hexyl.

(f) $R^2$ is methyl, propyl, isopropyl, butyl, pentyl, or hexyl substituted with fluoro, chloro, bromo, or iodo.

(g) $R^2$ is methyl, propyl, isopropyl, butyl, pentyl, or hexyl substituted with cyano or amino.

(h) $R^2$ is —$CH_2CN$ or —$CH_2CF_3$.

(i) $R^2$ is $(C_3$-$C_6$cycloalkyl)$C_0$-$C_2$alkyl which is optionally substituted with halogen, cyano, or amino.

(j) $R^2$ is $(C_3$-$C_6$cycloalkyl)$C_0$-$C_2$alkyl substituted with fluoro, chloro, bromo, or iodo.

(k) $R^2$ is $(C_3$-$C_6$cycloalkyl)$C_0$-$C_2$alkyl substituted with cyano or amino.

(l) $R^2$ is $C_3$-$C_6$cycloalkyl.

(m) $R^2$ is cyclopropyl, cyclobutyl, cyclopentyl, or cyclohexyl.

(n) $R^2$ is cyclopropyl, cyclobutyl, cyclopentyl, or cyclohexyl substituted with fluoro, chloro, bromo, or iodo.

(o) $R^2$ cyclopropyl, cyclobutyl, cyclopentyl, or cyclohexyl substituted with cyano or amino.

(p) $R^2$ is $(C_3$-$C_6$cycloalkyl)$C_1$-alkyl.

(q) $R^2$ is $(C_3$-$C_6$cycloalkyl)$C_2$-alkyl.

Pharmaceutical Compositions

Compounds disclosed herein can be administered as the neat chemical, but are preferably administered as a pharmaceutical composition. Accordingly, pharmaceutical compositions comprising a compound or pharmaceutically acceptable salt of Formula I, together with at least one pharmaceutically acceptable carrier are provided herein. The pharmaceutical composition may contain a compound or salt of Formula I as the only active agent, or may contain one or more additional active agents.

Compounds disclosed herein may be administered orally, topically, intravenously, intramuscularly, parenterally, by inhalation or spray, sublingually, transdermally, via buccal administration, rectally, as an ophthalmic solution, or by other means, in dosage unit formulations containing conventional pharmaceutically acceptable carriers. The pharmaceutical composition may be formulated as any pharmaceutically useful form, e.g., as an aerosol, a cream, a gel, a pill, a capsule, a tablet, a syrup, a transdermal patch, or an ophthalmic solution. Some dosage forms, such as tablets and capsules, are subdivided into suitably sized unit doses containing appropriate quantities of the active components, e.g., an effective amount to achieve the desired purpose.

Carriers include excipients and diluents and must be of sufficiently high purity and sufficiently low toxicity to render them suitable for administration to the patient being treated. The carrier can be inert or it can possess pharmaceutical benefits of its own. The amount of carrier employed in conjunction with the compound is sufficient to provide a practical quantity of material for administration per unit dose of the compound.

Classes of carriers include, but are not limited to binders, buffering agents, coloring agents, diluents, disintegrants, emulsifiers, flavorants, glidents, lubricants, preservatives, stabilizers, surfactants, tableting agents, and wetting agents. Some carriers may be listed in more than one class, for example vegetable oil may be used as a lubricant in some formulations and a diluent in others. Exemplary pharmaceutically acceptable carriers include sugars, starches, celluloses, powdered tragacanth, malt, gelatin; talc, and vegetable oils. Optional active agents may be included in a pharmaceutical composition, which do not substantially interfere with the activity of the compounds described herein.

The pharmaceutical compositions can be formulated for oral administration. These compositions contain between 0.1 and 99 weight % (wt. %) of a Formula I compound of the disclosure and usually at least about 5 wt. % of a Formula I compound of the disclosure. Some embodiments contain from about 25 wt. % to about 50 wt. % or from about 5 wt. % to about 75 wt. % of the Formula I compound of the disclosure.

Compounds of this disclosure can also be formulated for intravenous administration. Intravenous formulations of Formula I compounds can include one or more of a surface stabilizer (such as povidone or dextran), surfactant, preservative, pH adjuster, physiological saline, or sucrose. An injectable or intravenous formulation of this disclosure may include 0.25 mg/mL, 0.5 mg/mL, 1 mg/mL, 2 mg/mL, 5 mg/mL, 10 mg/mL, or 15 mg/ml of a Formula I compound of the disclosure.

Methods of Treatment

Methods of treating an allergic, inflammatory, or autoimmune disorder in a patient include administering a therapeutically effective amount of compounds of the present invention. A compound as described herein may be provided as the only active agent or may be provided together with one or more additional active agents.

In some embodiments, methods of treating pruritus, allergic dermatitis, eczema, or psoriasis in a patient include administering a therapeutically effective amount of compounds of the present disclosure.

Compounds of Formula I or its pharmaceutically acceptable salts and pharmaceutical compositions can be used to treat a variety of conditions or diseases such as:

Allergic reactions, including allergic dermatitis in mammal including horse allergic diseases such as bite hypersensitivity, summer eczema and sweet itch in horses;

Arthritis, including rheumatoid arthritis, juvenile arthritis, and psoriatic arthritis;

Asthma and other obstructive airways diseases, including chronic or inveterate asthma, late asthma, airway hyper-responsiveness, bronchitis, bronchial asthma, allergic asthma, intrinsic asthma, extrinsic asthma, dust asthma, recurrent airway obstruction, and chronic obstruction pulmonary disease;

Autoimmune diseases or disorders, including those designated as single organ or single cell-type autoimmune disorders, for example Hashimoto's thyroiditis, autoimmune hemolytic anemia, autoimmune atrophic gastritis of pernicious anemia, autoimmune encephalomyelitis, autoimmune orchitis, Goodpasture's disease, autoimmune thrombocytopenia, sympathetic ophthalmia, myasthenia gravis, Graves' disease, primary biliary cirrhosis, chronic aggressive hepatitis, ulcerative colitis and membranous glomerulopathy, those designated as involving systemic autoimmune disorder, for example systemic lupus erythematosis, rheumatoid arthritis, Sjogren's syndrome, Reiter's syndrome, polymyositis-dermatomyositis, systemic sclerosis, polyarteritis nodosa, multiple sclerosis and bullous pemphigoid, and additional autoimmune diseases, which can be O-cell (humoral) based or T-cell based, including Cogan's syndrome, ankylosing spondylitis, Wegener's granulomatosis, autoimmune alopecia, Type I or juvenile onset diabetes, and thyroiditis;

Cancers or tumors, including alimentary/gastrointestinal tract cancer, colon cancer, liver cancer, skin cancer including mast cell tumor and squamous cell carcinoma, breast and mammary cancer, ovarian cancer, prostate cancer, lymphoma, leukemia, including acute myelogenous leukemia and chronic myelogenous leukemia, kidney cancer, lung cancer, muscle cancer, bone cancer, bladder cancer, brain cancer, melanoma including oral and metastatic melanoma, Kaposi's sarcoma, myelomas including multiple myeloma, myeloproliferative disorders, proliferative diabetic retinopathy, and angiogenic-associated disorders including solid tumors;

Diabetes, including Type I diabetes and complications from diabetes;

Eye diseases, disorders or conditions including autoimmune diseases of the eye, keratoconjunctivitis, vernal conjunctivitis, uveitis including uveitis associated with Behcet's disease and lens-induced uveitis, keratitis, herpetic keratitis, conical keratitis, corneal epithelial dystrophy, keratoleukoma, ocular premphigus, Mooren's ulcer, scleritis, Grave's opthalmopathy, Vogt-Koyanagi-Harada syndrome, keratoconjunctivitis sicca (dry eye), phlyctenule, iridocyclitis, sarcoidosis, endocrine opthalmopathy, sympathetic ophthalmitis, allergic conjunctivitis, and ocular neovascularization;

Intestinal inflammations, allergies or conditions including Crohn's disease and/or ulcerative colitis, inflammatory bowel disease, coeliac diseases, proctitis, eosinophilic gastroenteritis, and mastocytosis;

Neurodegenerative diseases including motor neuron disease, Alzheimer's disease, Parkinson's disease, amyotrophic lateral sclerosis, Huntington's disease, cerebral ischemia, or neurodegenerative disease caused by traumatic injury, strike, glutamate neurotoxicity or hypoxia; ischemic/reperfusion injury in stroke, myocardial ischemica, renal ischemia, heart attacks, cardiac hypertrophy, atherosclerosis and arteriosclerosis, organ hypoxia, and platelet aggregation;

Skin diseases, conditions or disorders including atopic dermatitis, allergic dermatitis, eczema, psoriasis, scleroderma, pruritus and other pruritic conditions; and Transplant rejections, including pancreas islet transplant rejection, bone marrow transplant rejection, graft-versus-host disease, organ and cell transplant rejection such as bone marrow, cartilage, cornea, heart, intervertebral disc, islet, kidney, limb, liver, lung, muscle, myoblast, nerve, pancreas, skin, small intestine, or trachea, and xeno transplantation.

Compounds of present invention are JAK inhibitors with selective efficacy against JAK1. In some embodiments, more than 40%, 50%, 55%, 60%, 65%, 70%, 75%, 80%, 85%, 90%, 95%, 99% of JAK1 activity is inhibited in the human or non-human patient.

In certain embodiments, compounds of the disclosure preferentially inhibit activity of JAK1 over activity of JAK2. For example, preferential inhibition can be measured by JAK1/JAK2 potency ratio, defined as the inverse ratio of $IC_{50}$ of JAK1 inhibition over $IC_{50}$ of JAK2 inhibition. In certain embodiments, the JAK1/JAK2 potency ratio is at least 30, 35, 40, 45, 50, 55, 60, 65, 66, 67, 68, 69, 70, 71, 72, 73, 74, 75, 76, 77, 78, 79, 80, 85, or more. In other embodiments, the JAK1/JAK2 potency ratio is about 30 to about 85, about 40 to about 85, about 50 to about 85, about 60 to about 85, or about 70 to about 85. In some embodiments, the $IC_{50}$ of JAK1 and/or JAK2 inhibition is measured in an enzymatic assay. In certain embodiments, the $IC_{50}$ of JAK1 inhibition is measured by inhibition of IL6 stimulated STAT3 phosphorylation ex vivo, for example, using a sample (e.g., a blood example) from a subject administered with compound of Formula I. In certain embodiments, the $IC_{50}$ of JAK2 inhibition is measured by inhibition of EPO stimulated STAT5 phosphorylation ex vivo, for example, using a sample (e.g., a blood example) from a subject administered with a compound of Formula I.

In certain embodiments, compounds of the disclosure preferentially inhibit activity of JAK1 over activity of JAK3. For example, preferential inhibition can be measured by JAK1/JAK3 potency ratio, defined as the inverse ratio of $IC_{50}$ of JAK1 inhibition over $IC_{50}$ of JAK3 inhibition. In certain embodiments, the JAK1/JAK3 potency ratio is at least 3, 5, 10, 15, 20, 25, 30, 35, 40, 45, 50, 55, 56, 57, 58, 59, 60, 65, 70 or more. In other embodiments, the JAK1/JAK3 potency ratio is about 3 to about 70, about 10 to about 70, about 20 to about 70, about 30 to about 70, about 40 to about 70, about 50 to about 70, or about 60 to about 70. In some embodiments, the $IC_{50}$ of JAK1 and/or JAK3 inhibition is measured in an enzymatic assay. In certain embodiments, the $IC_{50}$ of JAK1 inhibition is measured by inhibition of IL6 stimulated STAT3 phosphorylation ex vivo, for example, using a sample (e.g., a blood example) from a subject administered with Formula I. In certain embodiments, the patient (e.g., human) is in need of treatment for a condition treatable by inhibition of JAK1 activity. In certain embodiments, the condition is treatable by systemic inhibition of JAK1 activity in the patient (e.g., human). Such condition may include an inflammatory disease/disorder, or an autoimmune disease/disorder.

The pharmaceutical compositions disclosed herein are useful for treating human and non-human patients. Non-human patients include, for example, livestock animals and companion animals.

An effective amount of a pharmaceutical composition as provided by this disclosure may be an amount sufficient to (a) cause a regression of a disorder; or (b) cause a cure of the disorder (c) reduce the severity of at least one symptom of a disorder, or (d) significantly decrease the likelihood of an asymptomatic patient as risk for a disorder from developing symptoms of the disorder or significantly reduce the severity of the symptoms of the disorder if they occur. An amount of a pharmaceutical composition needed to inhibit the progress or cause a regression of the disorder, includes an amount effective to stop the worsening of symptoms or reduce the symptoms experienced by an affected patient. Alternatively a halt in progression or regression of inflammatory or allergic symptoms may be indicated by any of several markers for the disease.

Methods of treatment include providing certain dosage amounts of a compound of Formula I to a patient. Dosage levels of each active agent of from about 0.1 mg to about 140 mg per kilogram of body weight per day are useful in the treatment of the above-indicated conditions (about 0.5 mg to about 7 g per patient per day). The amount of active ingredient that may be combined with the carrier materials to produce a single dosage form will vary depending upon the patient treated and the particular mode of administration. In certain embodiments, 25 mg to 500 mg, or 25 mg to 200 mg of a compound of Formula I are provided daily to a patient. Frequency of dosage may also vary depending on the compound used and the particular disease treated. However, for treatment of most allergic, inflammatory, or autoimmune disorders, a dosage regimen of 4 times daily or less is preferred and a dosage regimen of 1 or 2 times daily is particularly preferred.

It will be understood, however, that the specific dose level for any particular patient will depend upon a variety of factors including the activity of the specific compound employed, age, body weight, general health, sex, diet, time of administration, route of administration, rate of excretion, drug combination, and the severity of the particular disease in the patient undergoing therapy.

EXAMPLES

Abbreviations
ACN Acetonitrile
DCM Dichloromethane
DIPEA N,N-Diisopropylamine
DMF Dimethyl formamide
DMSO Dimethyl Sulfoxide
HEPES (4-(2-Hydroxyethyl)-1-piperazineethanesulfonic acid)
IS Internal Standard
General Methods The reagents and solvents are standard commercial grade. They are used without further purification, unless purification is specifically mentioned on implied by the examples. The following reaction schemes illustrate general synthetic procedures of the compounds of the present disclosure. All starting materials are prepared by procedures described in these schemes or by procedures known to one of ordinary skill in the art.

$^1$H NMR (400 MHZ) spectra was recorded on Bruker spectrometers at room temperature with TMS or the residual solvent peak as internal standard. The line positions or multiples are given in (δ) and the coupling constants (J) are given as absolute values in Hertz (Hz). The multiplicities in 1HNMR spectra are abbreviated as follows: s (singlet), d (doublet), t (triplet), q (quartet), m (multiplet), br or broad (broadened).

LC-MS was performed on Shimadzu LCMS-2020 equipped with LC-20AD or 30AD pumps, SPD-M20A PDA and Alltech 3300 ELSD; Mobile Phase: A: Water (0.1% Formic acid), B: ACN; 5 minute run; Column: Sepax BR-C18 4.6*50 mm, 3 μm; Flow Rate: 1.0 ml/min; Oven Temperature: 40° C.; Gradient: 20% B for 0.2 min, increase to 70% B within 1.8 min, 70% B for 2.8 min, back to 20% B within 0.2 min, 20% B for 2 min.

Example 1. Synthesis of Compounds

Compounds 1~4 were synthesized according to Scheme I.

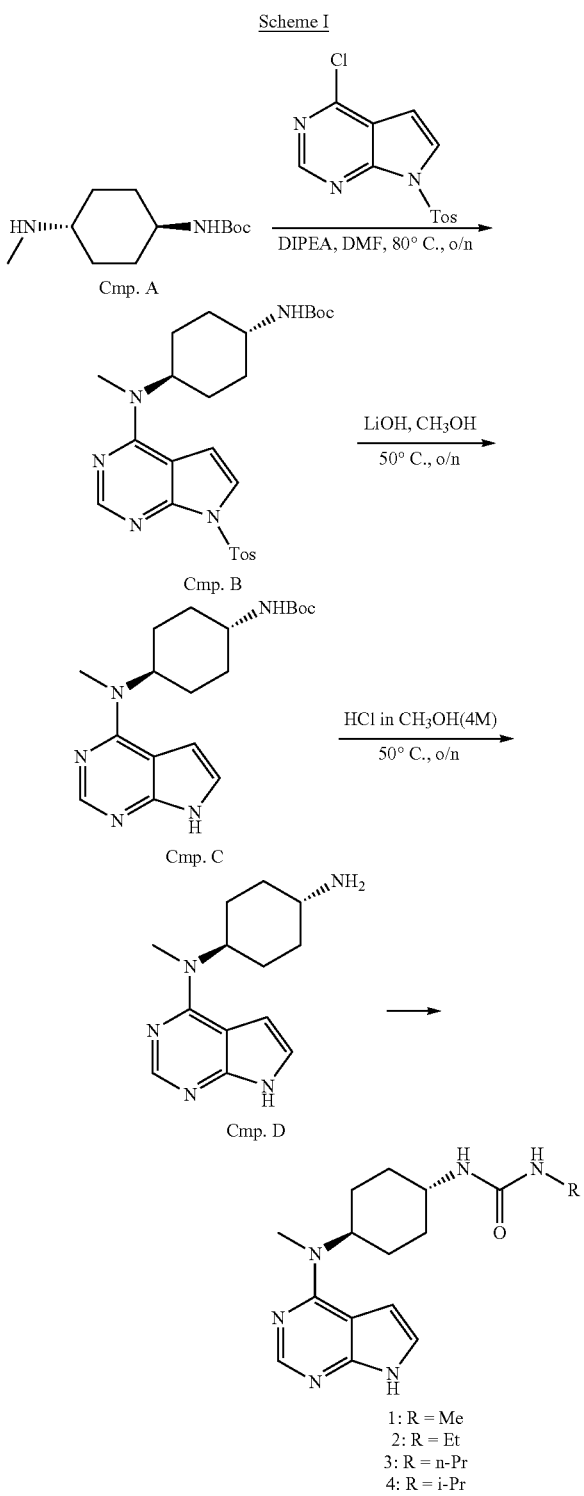

Synthesis of Cmp. B. To a stirred solution of Cmp. A (2.25 g, 9.89 mmol) in DMF (15 mL) was added N,N-diisopropylethylamine (2.55 g, 19.78 mmol) and 4-chloro-7-tosyl-7H-pyrrolo[2,3-d]pyrimidine (3.19 g, 10.38 mmol). The mixture was stirred at 80° C. overnight. TLC showed the reaction was complete. The reaction mixture was added water and extracted ethyl acetate (50 ml). The organic was washed with brine (3×40 ml), dried over anhydrous sodium sulfate, filtered, and concentrated under reduced pressure to afford crude residue which was purified through silica gel flash column chromatography (eluted with 5% ethyl acetate in hexane (50%) and dichloromethane (50%)) to afford Cmp. B (2.7 g, yield 56%) as white solid. $^1$H NMR (400 MHZ, CDCl$_3$): δ 1.27-1.38 (m, 4H), 1.45 (s, 9H), 1.76-1.79 (m, 2H), 2.06-2.12 (m, 2H), 2.38 (s, 3H), 3.13 (s, 3H), 3.40-3.45 (m, 1H), 4.40-4.42 (m, 1H), 4.66-4.72 (m, 1H), 6.60 (d, J=4.4 Hz, 1H), 7.26 (s, 1H), 7.29 (s, 1H), 7.44 (d, J=4.0 Hz, 1H), 8.05 (d, J=8.4 Hz, 2H), 8.37 (s, 1H); LC-MS: (ES$^+$): m/z [M+H]$^+$ calc'd for C$_{25}$H$_{33}$N$_5$O$_4$S: 499.23. Found 500.5.

Synthesis of Cmp. C. To a stirred solution of Cmp. B (2.7 g, 5.41 mmol) in methanol (50 ml) was added lithium hydroxide monohydrate (2.27 g, 54.1 mmol). The mixture was stirred at 50° C. overnight. TLC showed the reaction was complete. The reaction mixture was concentrated under reduced pressure. Water was added (10 ml) and the mixture was adjusted to pH=6.0 with 2M hydrochloric acid, filtered and the solid was collected. The solid was washed with diethyl ether (20 ml) and dried to afford Cmp. B (1.53 g, yield 81%) as white solid. $^1$H NMR (400 MHZ, DMSO-d$_6$): δ 1.29-1.36 (m, 2H), 1.39 (s, 9H), 1.63-1.75 (m, 4H), 1.86-1.89 (m, 2H), 3.15 (s, 3H), 3.27-3.30 (m, 1H), 4.66-4.68 (m, 1H), 6.52 (s, 1H), 6.73 (d, J=8.0 Hz, 1H), 7.10-7.12 (m, 1H), 8.08 (s, 1H), 11.58 (s, 1H); LC-MS: (ES$^+$): m/z [M+H]$^+$ calc'd for C$_{18}$H$_{27}$N$_5$O$_2$:345.22. Found 346.3.

Synthesis of Cmp. D. To a solution of Cmp. C (1.53 g, 4.43 mmol) in 4M hydrochloric acid in methanol (60 ml). The resulting mixture was stirred at 50° C. overnight. TLC showed the reaction was complete. The resulting mixture was concentrated under reduced pressure. The solid was washed with diethyl ether (20 ml) and dried to afford Cmp. D (960 mg, yield 90%) as white solid. $^1$H NMR (400 MHZ, DMSO-d$_6$): δ 1.65-1.72 (m, 2H), 1.84-1.89 (m, 4H), 2.08-2.10 (m, 2H), 3.08-3.09 (m, 1H), 3.34 (s, 3H), 4.46-4.54 (m, 1H), 6.89 (s, 1H), 7.47 (s, 1H), 8.28-8.35 (m, 3H), 12.88 (s, 1H); LC-MS: (ES$^+$): m/z [M+H]$^+$ calc'd for C$_{13}$H$_{19}$N$_5$: 345.16. Found 245.9.

Synthesis of 1. To a stirred solution of Cmp. D (150 mg, 0.61 mmol) in N,N-dimethylformamide (2 ml) and dichloromethane (2 ml) was added N,N-diisopropylethylamine (393.4 mg, 3.05 mmol) and methylcarbamic chloride (70.7 mg, 0.73 mmol). The resulting mixture was stirred at room temperature for 1 h. TLC showed the reaction was complete. The resulting mixture was concentrated under reduced pressure. Crude was purified by silica gel chromatography (eluted with 8% dichloromethane in methanol) to afford 1 (83.3 mg, yield 45%) as white solid. $^1$H NMR (400 MHZ, DMSO-d$_6$): δ 1.24-1.31 (m, 2H), 1.64-1.72 (m, 4H), 1.89-1.92 (m, 2H), 2.54 (d, J=4.4 Hz, 3H), 3.16 (s, 3H), 3.38-3.42 (m, 1H), 4.68 (s, 1H), 5.59-5.63 (m, 1H), 5.73 (d, J=8.0 Hz, 1H), 6.52-6.53 (m, 1H), 7.10-7.12 (m, 1H), 8.08 (s, 1H), 11.58 (s, 1H); LC-MS: (ES$^+$): m/z [M+H]$^+$ calc'd for C$_{15}$H$_{22}$N$_6$O: 302.19. Found 302.9.

Synthesis of 2. To a stirred solution of Cmp. D (145 mg, 0.59 mmol) in N,N-dimethylformamide (2 ml) and dichloromethane (2 ml) was added N,N-diisopropylethylamine (380.6 mg, 2.95 mmol) and isocyanatoethane (62 mg, 0.88 mmol). The resulting mixture was stirred at room temperature for 1 h. TLC showed the reaction was complete. The resulting mixture was added to the water (15 ml), filtered and the solid was collected. The solid was washed with diethyl ether (20 ml) and dried to afford 2 (105.5 mg, yield 56%) as white solid. 1H NMR (400 MHZ, DMSO-d$_6$): δ0.98 (t, J=7.2 Hz, 3H), 1.23-1.33 (m, 2H), 1.64-1.78 (m, 4H), 1.89-1.93 (m, 2H), 2.97-3.03 (m, 2H), 3.16 (s, 3H), 3.36-3.43 (m, 1H), 4.68 (s, 1H), 5.64-5.70 (m, 2H), 6.52-6.53 (m, 1H), 7.11 (t, J=2.8 Hz, 1H), 8.08 (s, 1H), 11.58 (s, 1H); LC-MS: (ES$^+$): m/z [M+H]$^+$ calc'd for C$_{16}$H$_{24}$N$_6$O: 316.2. Found 317.0.

Synthesis of 3. To a stirred solution of Cmp. D (150 mg, 0.61 mmol) in N,N-dimethylformamide (2 ml) and dichloromethane (2 ml) was added N,N-diisopropylethylamine (393.4 mg, 3.05 mmol) and 1-isocyanatopropane (78 mg, 0.92 mmol). The resulting mixture was stirred at room temperature for 1 h. TLC showed the reaction was complete. The resulting mixture was added to the water (15 ml), filtered and the solid was collected. The solid was washed with diethyl ether (20 ml) and purified by silica gel chromatography (eluted with 7% dichloromethane in methanol) to afford 3 (105.3 mg, yield 52%) as white solid. $^1$H NMR (400 MHz, DMSO-d$_6$): δ 0.83 (t, J=7.2 Hz, 3H), 1.24-1.30 (m, 2H), 1.34-1.41 (m, 2H), 1.64-1.75 (m, 4H), 1.90-1.93 (m, 2H), 2.91-2.96 (m, 2H), 3.16 (s, 3H), 3.36-3.42 (m, 1H), 4.68-4.70 (m, 1H), 5.65 (d, J=8.0 Hz, 1H), 5.72-5.76 (m, 1H), 6.52-6.54 (m, 1H), 7.10-7.12 (m, 1H), 8.08 (s, 1H), 11.58 (s, 1H); LC-MS: (ES$^+$): m/z [M+H]$^+$ calc'd for C$_{17}$H$_{26}$N$_6$O: 330.22. Found 331.3.

Synthesis of 4. To a stirred solution of Cmp. D (130 mg, 0.53 mmol) in N,N-dimethylformamide (2 ml) and dichloromethane (2 ml) was added N,N-diisopropylethylamine (341.8 mg, 2.65 mmol) and 2-isocyanatopropane (54 mg, 0.64 mmol). The resulting mixture was stirred at room temperature for 1 h. TLC showed the reaction was complete. The resulting mixture was added to the water (15 ml), filtered and the solid was collected. The solid was washed with diethyl ether (20 ml) and purified by silica gel chromatography (eluted with 7% dichloromethane in methanol) to afford 4 (103.5 mg, yield 59%) as white solid. $^1$H NMR (400 MHz, DMSO-d$_6$): δ 1.02 (d, J=6.4 Hz, 6H), 1.21-1.32 (m, 2H), 1.64-1.74 (m, 4H), 1.90-1.93 (m, 2H), 3.16 (s, 3H), 3.37-3.41 (m, 1H), 3.63-3.68 (m, 1H), 4.68 (s, 1H), 5.54-5.57 (m, 2H), 6.52-6.53 (m, 1H), 7.10-7.12 (m, 1H), 8.08 (s, 1H), 11.57 (s, 1H); LC-MS: (ES$^+$): m/z [M+H]$^+$ calc'd for C$_{17}$H$_{26}$N$_6$O: 330.22. Found 331.3.

Compound 5 was synthesized according to Scheme II.

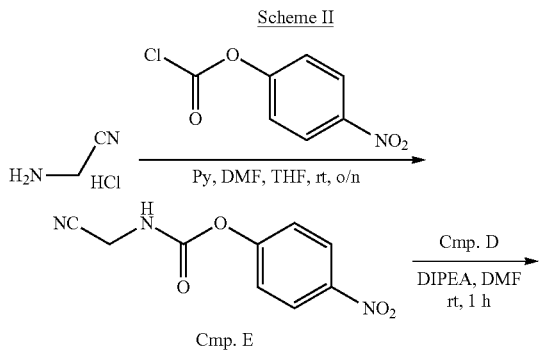

-continued

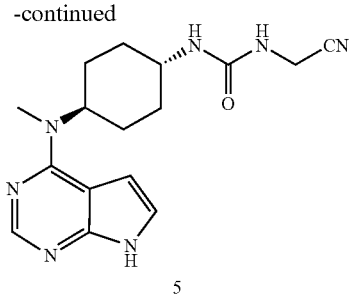

5

Synthesis of Cmp. E. To a stirred solution of 2-aminoacetonitrile hydrochloride (1 g, 10.87 mmol) in N,N-dimethylformamide (20 ml) was added pyridine (1.03 g, 13.04 mmol) and a solution of 4-nitrophenyl carbonochloridate (2.6 g, 13.04 mmol) in tetrahydrofuran (10 ml) at 0° C. The mixture was stirred at 0° C. for 15 min and continued to stir at room temperature overnight. TLC showed the reaction was complete. Water was added the reaction mixture and extracted ethyl acetate (80 ml). The organic was washed with brine (3×50 ml), dried over anhydrous sodium sulfate, filtered, and concentrated under reduced pressure to afford crude residue which was purified through silica gel flash column chromatography (eluted with 10%-30% ethyl acetate in hexane) to afford Cmp. E (500 mg, yield 21%) as white solid. $^1$H NMR (400 MHZ, DMSO-$d_6$): δ 4.26 (d, J=6.0 Hz, 2H), 7.46-7.48 (m, 2H), 8.28-8.30 (m, 2H), 8.81-8.24 (m, 1H).

Synthesis of 5. To a stirred solution of Cmp. D (250 mg, 1.02 mmol) in N,N-dimethylformamide (5 ml) was added N,N-diisopropylethylamine (658 mg, 5.10 mmol) and 4-nitrophenyl (cyanomethyl) carbamate (purity 88% by $^1$H NMR) (306 mg, 1.22 mmol). The resulting mixture was stirred at room temperature for 1 h. TLC showed the reaction was complete. The reaction mixture concentrated under reduced pressure to afford crude residue which was purified through silica gel flash column chromatography (eluted with 7% dichloromethane in methanol) to afford 5 (118.9 mg, yield 35%) as white solid. $^1$H NMR (400 MHz, DMSO-$d_6$): δ1.26-1.38 (m, 2H), 1.65-1.76 (m, 4H), 1.91-1.94 (m, 2H), 3.16 (s, 3H), 3.42-3.46 (m, 1H), 4.03 (d, J=6.0 Hz, 2H), 4.69 (s, 1H), 6.26 (d, J=7.6 Hz, 1H), 6.35 (d, J=6.0 Hz, 1H), 6.53-6.54 (m, 1H), 7.11-7.12 (m, 1H), 8.09 (s, 1H), 11.59 (s, 1H); LC-MS: (ES+): m/z [M+H]+ calc'd for $C_{16}H_{21}N_7O$: 327.18. Found 328.3.

Compound 6 was synthesized according to Scheme III.

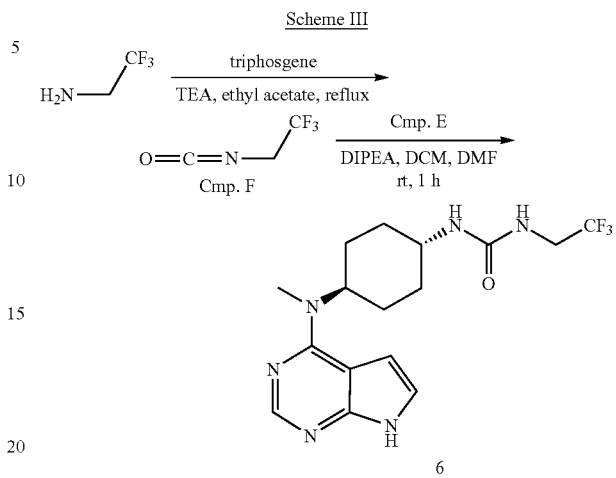

Synthesis of Cmp. F. To a stirred solution of 2,2,2-trifluoroethanamine (1 g, 10.10 mmol) in ethyl acetate (50 ml) was added trimethylamine (255 mg, 2.52 mmol) and a solution of triphosgene (1.49 g, 5.05 mmol) in ethyl acetate (10 ml) at 0° C. The mixture was stirred at 0° C. for 30 min and continue to stir at room temperature for 1 h and reflux for 5 h. TLC showed the reaction was complete. The reaction mixture was concentrated under reduced pressure to afford crude Cmp. F (1 g, crude) as yellow oil.

Synthesis of 6. To a stirred solution of Cmp. D (250 mg, 1.02 mmol) in N,N-dimethylformamide (20 ml) was added N,N-diisopropylethylamine (526 mg, 4.08 mmol) and 1,1,1-trifluoro-2-isocyanatoethane (191 mg, 1.53 mmol). The resulting mixture was stirred at room temperature for 1 h. TLC showed the reaction was complete. The reaction mixture concentrated under reduced pressure to afford crude residue which was purified through silica gel flash column chromatography (eluted with 7% dichloromethane in methanol) to afford 6 (107.2 mg, yield 28%) as white solid. $^1$H NMR (400 MHZ, DMSO-$d_6$): δ 1.26-1.36 (m, 2H), 1.66-1.77 (m, 4H), 1.92-1.94 (m, 2H), 3.16 (s, 3H), 3.43-3.45 (m, 1H), 3.77-3.86 (m, 2H), 4.68 (s, 1H), 6.07 (d, J=8.0 Hz, 1H), 6.35-6.39 (m, 1H), 6.55 (s, 1H), 7.13-7.14 (m, 1H), 8.10 (s, 1H), 11.63 (s, 1H); LC-MS: (ES+): m/z [M+H]+ calc'd for $C_{16}H_{21}F_3N_6O$: 370.17. Found 371.3.

The following compounds of Formula I (in Table 1) were prepared by the methods shown in Schemes I-III.

TABLE 1

| Cmpd # | Structure | Name |
|---|---|---|
| 1 |  | 1-methyl-3-((1r,4r)-4-(methyl(7H-pyrrolo[2,3-d]pyrimidin-4-yl)amino)cyclohexyl)urea |

TABLE 1-continued

| Cmpd # | Structure | Name |
|---|---|---|
| 2 | | 1-ethyl-3-((1r,4r)-4-(methyl(7H-pyrrolo[2,3-d]pyrimidin-4-yl)amino)cyclohexyl)urea |
| 3 | | 1-propyl-3-((1r,4r)-4-(methyl(7H-pyrrolo[2,3-d]pyrimidin-4-yl)amino)cyclohexyl)urea |
| 4 | | 1-isopropyl-3-((1r,4r)-4-(methyl(7H-pyrrolo[2,3-d]pyrimidin-4-yl)amino)cyclohexyl)urea |
| 5 | | 1-(cyanomethyl)-3-((1r,4r)-4-(methyl(7H-pyrrolo[2,3-d]pyrimidin-4-yl)amino)cyclohexyl)urea |
| 6 | | 1-((1r,4r)-4-(methyl(7H-pyrrolo[2,3-d]pyrimidin-4-yl)amino)cyclohexyl)-3-(2,2,2-trifluoroethyl)urea |

Example 2. Potency Against JAK Family Kinases

A. JAK1, JAK2, and JAK3 Enzymatic Assays

The JAK1/JAK2 potency ratio, defined as the inverse ratio of $IC_{50}$ values for JAK1 over JAK2, is about at least 30, and in some cases 50 to 85 or more. The JAK1/JAK3 potency ratio, defined as the inverse ratio of $IC_{50}$ values for JAK1 over JAK3, is about at least 3, and in some cases 40 to 70 or more.

The assay results demonstrate significantly lower $IC_{50}$ values for JAK1 inhibition, which shows the selectivity of compounds of Formula I for JAK1 over JAK2 and JAK3, and provide a basis for determining whether a more selective biochemical profile will translate into an improved clinical profile by sparing the JAK2 or JAK-dependent cellular pathways.

The JAK enzymatic assay used the following reagents.

JAK1 (BPS Bioscience, San Diego, CA Cat.No. 40449)
JAK2 (Carna Bio, USA, Inc. Natick, MA, Cat.No. 08-045)
JAK3 (Carna Bio, USA, Inc. Natick, MA, Cat.No. 08-046)
TYK2 (Carna Bio, USA, Inc. Natick, MA, Cat.No 08-147)
Peptide FAM-P22 (GL Biochem, Cat. No. 112393)
Peptide FAM-Pep D (GL Biochem, Cat No.358783)
Peptide FAM-P30 (GL Biochem, Cat. No. 263631)
ATP (Millipore Sigma, Cat. No. A7699-1G, CAS No. 987-65-5)
DMSO (Millipore Sigma, Cat. No. D2650)
EDTA (Millipore Sigma, Cat. No. E5134, CAS No. 60-00-4)
Brij-35 [Sigma, Cat. No. B4184]
96-well plate (Corning, Corning, NY, Cat. No. 3365)
384-well plate (Corning, Corning, NY, Cat. No. 3573)
Oclacitinib [HUIFEIChem (WuXi) PharmaTech Co. Ltd., Batch No.: D0228-W-0814-1]
Tofacitinib (Med Chem Express, Monmouth Junction, NJ, Cat. No. HY-40354)
Filgotinib [MCE, Cat. No. HY-18300]

Preparation of assay plate. Each sample or reference compound was diluted to 50× the desired highest inhibitor concentration with DMSO. Each sample or reference compound was serially diluted using a 96-well source plate so that there were 10 concentrations for testing. 10 µL from each well of the source plate was transferred to a 96-well intermediate plate. To each well of the intermediate plate was added 90 µL of the 1× kinase buffer (50 mM HEPES, pH 7.5, 0.0015% Brij-35) and the intermediate plates were shaken on a shaker for 10 min. 5 µL from each well of the 96-well intermediate plate was transferred to a 384-well plate.

Kinase reaction. 10 µL of 2.5× enzyme solution (([enzyme in 1× kinase base buffer) was added to the respective well of the assay plate The assay plate was incubated at room temperature for 10 minutes. 10 µL of 2.5× peptide solution (FAM-labeled peptide and ATP in 1× kinase base buffer) was added to the respective well of the assay plate. The kinase reaction proceeded for 28° C. for 60 min followed by the addition of 25 µL of stop buffer. The data was collected using the CALIPER program. The conversion data from the CALIPER program was converted to inhibition values as follows: % inhibition=(maximum conversion)/(max−min) *100. The term "max" refers to the DMSO control and "min" stands for low control. Curve-fitting of the data was performed using Xlfit excel add-in version 5.4.0.8 to obtain $IC_{50}$ values. Equation used was Y=Bottom+(Top−Bottom)/(1+(Log $IC_{50}$/X)^HillSlope. The peptide substrates used for each kinase, peptide concentration, enzyme concentration, and ATP concentrations are presented in TABLE 2.

TABLE 2

| Kinase | Substrate | Peptide concentration (µM) | Enzyme (nM) | ATP concentration (µM) |
|---|---|---|---|---|
| JAK1 | Peptide D | 3 | 3 | 66 |
| JAK2 | Peptide22 | 3 | 1 | 6.5 |
| JAK3 | Peptide22 | 3 | 4 | 6.2 |
| TYK2 | Peptide30 | 3 | 15 | 16 |

The results are shown in TABLE 3.

TABLE 3

| Compound | JAK1 $IC_{50}$ (nM) | JAK2 $IC_{50}$ (nM) | JAK3 $IC_{50}$ (nM) | TYK2 $IC_{50}$ (nM) |
|---|---|---|---|---|
| 1 | 156 | 292 | 618 | 3821 |
| 2 | 43 | 126 | 447 | 1788 |
| 3 | 19 | 70 | 207 | 1511 |
| 4 | 40 | 134 | 615 | 2710 |
| 5 | 7.5 | 18 | 26 | 415 |
| 6 | 2.3 | 14 | 42 | 335 |
| Oclacitinib | 6.6 | 9.3 | 70 | 77 |
| Tofacitinib | 2.6 | 1.9 | 1.0 | 46 |
| Filgotinib | 42 | 42 | 900 | 216 |

Oclacitinib, Tofacitinib, and Filgotinib were used as reference compounds.

Oclacitinib

Tofacitinib

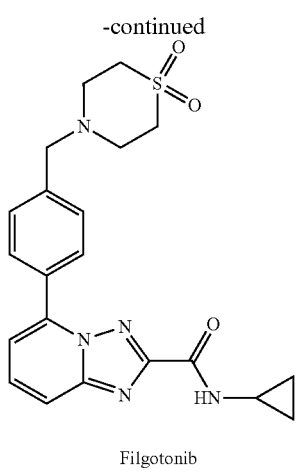

Filgotonib

As shown in Table 3, Oclacitinib has similar activity for JAK1 and JAK2, Tofacitinib inhibited JAK1, JAK2, and JAK 3 similarly, and Filgotinib exhibited selectivity for JAK1 and JAK2 over JAK3. Regarding JAK1/JAK2 selectivity, of the reference compounds, only Oclacitinib showed selectivity for JAK1/JAK2 (i.e., 45%). Tofacitinib and Filgotinib were not selective for JAK1/JAK2. Advantageously, Compounds 1-6 exhibited superior selectivity for JAK1 over JAK2 (i.e., 87%, 2.9-fold, 3.7-fold, 3.35-fold, 2.4-fold, and 6-fold, respectively). Regarding JAK1/JAK3 selectivity, of the reference compounds, Oclacitinib and Filgotinib showed selectivity for JAK1 over JAK3 (i.e., 10.6-fold and 21-fold, respectively), whereas Tofacitinib demonstrated selectivity of JAK3 over JAK1. The selectivity of Compounds 1-6 for JAK1 over JAK 3 vastly improved over the reference compounds (i.e., 3.96-fold, 10.4-fold, 10.9-fold, 15.4-fold, 3.5-fold, and 18.3-fold, respectively). Of the reference compounds, only Oclacitinib was selective for JAK1 over both JAK2 and JAK3 (i.e., 45% and 10.6-fold, respectively. Surprisingly and unexpectedly, Compounds 1-6 were selective for JAK1 over JAK2 and JAK1 over JAK3 with superior values as compared with the reference compounds.

Example 3. Metabolic Stability Assay

Stock solutions of the sample and reference compounds were prepared in DMSO (10 mM). A spiking solution (500 µM) was prepared for each sample compound and reference compound by diluting 10 µL of the stock solution in ACN (190 µL). A microsomal spiking solution having a microsome concentration of 0.75 mg/mL was prepared for each sample: 1.5 µL of the respective 500 µM spiking solution was mixed with 18.75 µL microsomal solution (pooled liver microsomes, 20 mg/mL in 250 mM sucrose, Corning, Cat. No. 452601, Lot. No. 8176003) and 479.75 µL buffer (0.1 M potassium phosphate buffer, 1.0 mM EDTA, pH 7.4). The microsomal spiking solutions were cooled on ice. Assay plates with wells designated for different time points (0, 5, 15, 30 and 45 minutes) were cooled on ice. 30 µL of each microsomal spiking solution was added to the wells designated for different time points (0, 5, 15, 30 and 45 minutes). 135 µL of ACN containing IS was added to the wells of the plate labelled 0 minutes followed by 15 µL of the NaDPH stock solution (6 mM NaDPH in 0.1 M Potassium Phosphate buffer, 1.0 mM EDTA, pH 7.4). The plates for 5, 15, 30 and 45 minutes were incubated at 37° C. for 5 minutes. At 5 min, 10 min, 30 min, and 45 min, 135 µL of ACN containing IS was added to the wells of the corresponding plates to quench the reaction. The plates were shaken [IKA vibrator, MTS 2/4] for 10 minutes and centrifuged at 5594 G for 15 minutes (Thermo Multifuge×3R). 50 µL of the supernatant from each well was transferred to a 96-well sample plate containing 50 µL of ultrapure water (Millipore, ZMQS50F01) for LC-MS analysis.

TABLE 4

| Compound | Species | | Percent Remaining (%) | | | | | $T_{1/2}$ (minute) | $Cl_{int}$ (mL/min/kg) |
| | | | 0 min | 5 min | 15 min | 30 min | 45 min | | |
| --- | --- | --- | --- | --- | --- | --- | --- | --- | --- |
| ketanserin | dog | Mean | 100.00 | 82.91 | 62.01 | 42.37 | 36.16 | 30.28 | 114.12 |
| | | RSD of Area Ratio | 0.03 | 0.00 | 0.01 | 0.05 | 0.02 | | |
| 3 | dog | Mean | 100.00 | 94.76 | 86.94 | 75.53 | 73.67 | 97.70 | 35.36 |
| | | RSD of Area Ratio | 0.05 | 0.00 | 0.01 | 0.07 | 0.01 | | |
| 5 | dog | Mean | 100.00 | 100.66 | 95.39 | 87.57 | 86.91 | 189.49 | 18.23 |
| | | RSD of Area Ratio | 0.02 | 0.03 | 0.01 | 0.02 | 0.02 | | |
| 6 | dog | Mean | 100.00 | 93.91 | 85.39 | 76.25 | 71.95 | 94.67 | 36.50 |
| | | RSD of Area Ratio | 0.02 | 0.01 | 0.01 | 0.05 | 0.03 | | |
| Oclacitinib | dog | Mean | 100.00 | 94.12 | 82.56 | 68.65 | 62.97 | 65.25 | 52.95 |
| | | RSD of Area Ratio | 0.02 | 0.01 | 0.06 | 0.03 | 0.04 | | |

In the metabolic stability assay, Oclacitinib and ketanserin were used as reference compounds. Microsomal assays primarily assess metabolism by the cytochrome P450 system (phase I enzymes). As shown in TABLE 4, Compounds 3, 5, and 6 had dramatically improved half-lives as compared with the reference compounds. Therefore, Compounds 3, 5, and 6 are less vulnerable to first-pass metabolism by the liver as compared with the reference compounds.

What is claimed is:

1. A compound of Formula I:

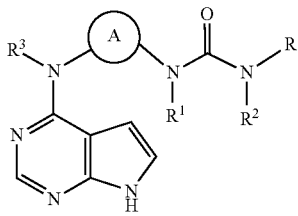

Formula I or a pharmaceutically acceptable salt or stereoisomer thereof,
wherein:
Ring A,

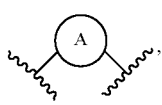

is $C_3$-$C_7$ cycloalkylene;

R is $C_1$-$C_6$ alkyl, wherein the $C_1$-$C_6$ alkyl is optionally substituted with one or more substituents independently selected from the group consisting of halogen, CN, and $NH_2$;

$R^1$ is H, $C_1$-$C_6$ alkyl, $C_1$-$C_2$ alkylene-$C_3$-$C_6$ cycloalkyl, $C_1$-$C_2$ alkylene-4- to 6-membered heterocyclyl, $C_1$-$C_2$ alkylene-phenyl, $C_3$-$C_6$ cycloalkyl, 4- to 6-membered heterocyclyl, or phenyl, wherein the $C_1$-$C_6$ alkyl is optionally substituted with one or more substituents independently selected from the group consisting of halogen, CN, and $NH_2$;

$R^2$ is H, $C_1$-$C_6$ alkyl, $C_1$-$C_2$ alkylene-$C_3$-$C_6$ cycloalkyl, $C_1$-$C_2$ alkylene-4- to 6-membered heterocyclyl, $C_1$-$C_2$ alkylene-phenyl, $C_3$-$C_6$ cycloalkyl, 4- to 6-membered heterocyclyl, or phenyl, wherein the $C_1$-$C_6$ alkyl is optionally substituted with one or more substituents independently selected from the group consisting of halogen, CN, and $NH_2$; and $R^3$ is $C_1$-$C_4$ alkyl.

2. The compound of claim 1, or a pharmaceutically acceptable salt or stereoisomer thereof, wherein Ring A is cyclopropylene, cyclobutylene, cyclopentylene, or cyclohexylene.

3. The compound of claim 1, wherein the compound is of Formula IA:

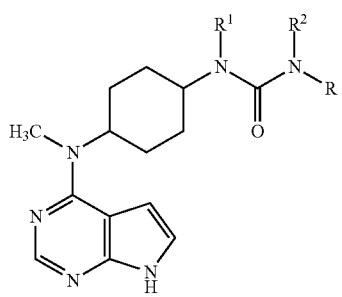

Formula IA or a pharmaceutically acceptable salt or stereoisomer thereof,
wherein:
R is $C_1$-$C_6$ alkyl, wherein the $C_1$-$C_6$ alkyl is optionally substituted with one or more substituents independently selected from the group consisting of halogen, CN, and $NH_2$;

$R^1$ is H, $C_1$-$C_6$ alkyl, $C_1$-$C_2$ alkylene-$C_3$-$C_6$ cycloalkyl, or $C_3$-$C_6$ cycloalkyl; and $R^2$ is H, $C_1$-$C_6$ alkyl, $C_1$-$C_2$ alkylene-$C_3$-$C_6$ cycloalkyl, or $C_3$-$C_6$ cycloalkyl.

4. The compound of claim 3, or a stereoisomer thereof, wherein the stereoisomer of the compound is of Formula IB:

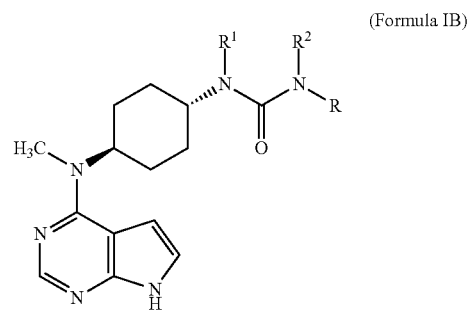

(Formula IB)

or a pharmaceutically acceptable salt thereof.

5. The compound of claim 3, or a pharmaceutically acceptable salt or stereoisomer thereof, wherein R is $CH_3$, $CH_2CN$, $CH_2CH_3$, $CH_2CF_3$, $CH_2CH_2CH_3$, or $CH(CH_3)_2$.

6. The compound of claim 3, or a pharmaceutically acceptable salt or stereoisomer thereof, wherein:
$R^1$ is H; and
$R^2$ is H.

7. The compound of claim 1, or a pharmaceutically acceptable salt or stereoisomer thereof, wherein at least one of $R^1$ and $R^2$ is $CH_3$, $CH_2CH_3$, $CH_2CH_2CH_3$, $CH_2CH_2CH_2CH_3$, $CH_2CH_2CH_2CH_2CH_3$, or $CH_2CH_2CH_2CH_2CH_2CH_3$.

8. The compound of claim 1, or a pharmaceutically acceptable salt or stereoisomer thereof, wherein at least one of $R^1$ and $R^2$ is $CH_3$, $CH_2CH_3$, $CH_2CH_2CH_3$, $CH_2CH_2CH_2CH_3$, $CH_2CH_2CH_2CH_2CH_3$, or $CH_2CH_2CH_2CH_2CH_2CH_3$, wherein the $CH_3$, $CH_2CH_3$, $CH_2CH_2CH_3$, $CH_2CH_2CH_2CH_3$, $CH_2CH_2CH_2CH_2CH_3$, or $CH_2CH_2CH_2CH_2CH_2CH_3$ is substituted with one or more substituents independently selected from the group consisting of halogen, CN, and $NH_2$.

9. The compound of claim 1, or a pharmaceutically acceptable salt or stereoisomer thereof, wherein at least one of $R^1$ and $R^2$ is $CH_2$—$C_3$-$C_6$ cycloalkyl.

10. The compound of claim 1, or a pharmaceutically acceptable salt or stereoisomer thereof, wherein at least one of $R^1$ and $R^2$ is $CH_2CH_2$—$C_3$-$C_6$ cycloalkyl.

11. The compound of claim 1, or a pharmaceutically acceptable salt or stereoisomer thereof, wherein at least one of $R^1$ and $R^2$ is $C_3$-$C_6$ cycloalkyl.

12. The compound of claim 1, or a stereoisomer thereof, wherein the stereoisomer of the compound is selected from the group consisting of:

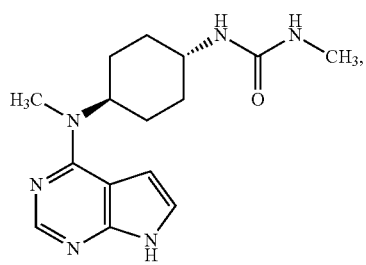

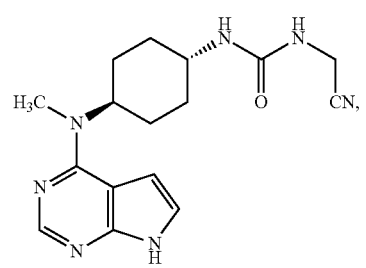

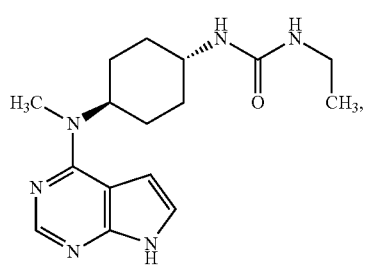

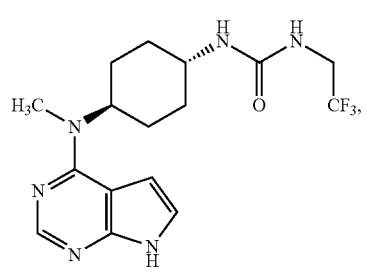

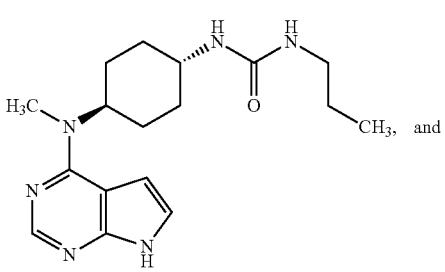

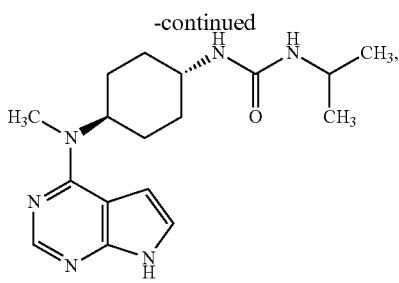

or a pharmaceutically acceptable salt thereof.

13. A pharmaceutical composition comprising a pharmaceutically acceptable excipient together with the compound of claim 1, or a pharmaceutically acceptable salt or stereoisomer thereof.

14. The pharmaceutical composition of claim 13, wherein the pharmaceutical composition is formulated as an aerosol, a capsule, a cream, a gel, an ophthalmic solution, a pill, a syrup, a tablet, or a transdermal patch.

15. The pharmaceutical composition of claim 14, wherein the pharmaceutical composition further comprises the compound, or a pharmaceutically acceptable salt or stereoisomer thereof, in an amount in the range of 0.1 weight percent (wt. %) to 99 weight percent (wt. %).

16. A method for treating an allergic disorder, inflammatory disorder, or autoimmune disorder in a patient, wherein the method comprises administering to the patient in need thereof a therapeutically effective amount of the compound of claim 1, or a pharmaceutically acceptable salt or stereoisomer thereof.

17. The method of claim 16, wherein the allergic disorder, inflammatory disorder, or autoimmune disorder is selected from the group consisting of an allergic reaction, arthritis, asthma, cancer, diabetes, an eye disease, an intestinal inflammation, a neurodegenerative disease, an obstructive airway disease, a skin disease, and a transplant reaction.

18. The method of claim 16, wherein the allergic disorder, inflammatory disorder, or autoimmune disorder is selected from the group consisting of allergic dermatitis, eczema, pruritis, and psoriasis.

19. The method of claim 16, wherein the method further comprises administering to the patient in need thereof a therapeutically effective amount of the compound, or a pharmaceutically acceptable salt or stereoisomer thereof, via a route of administration selected from the group consisting of buccally, intramuscularly, intravenously, nasally, as an ophthalmic solution, orally, parenterally, rectally, sublingually, topically, and transdermally.

20. The method of claim 16, wherein the patient is a companion animal or livestock animal.

21. The method of claim 16, wherein the patient is a human.

* * * * *